Patented June 10, 1947

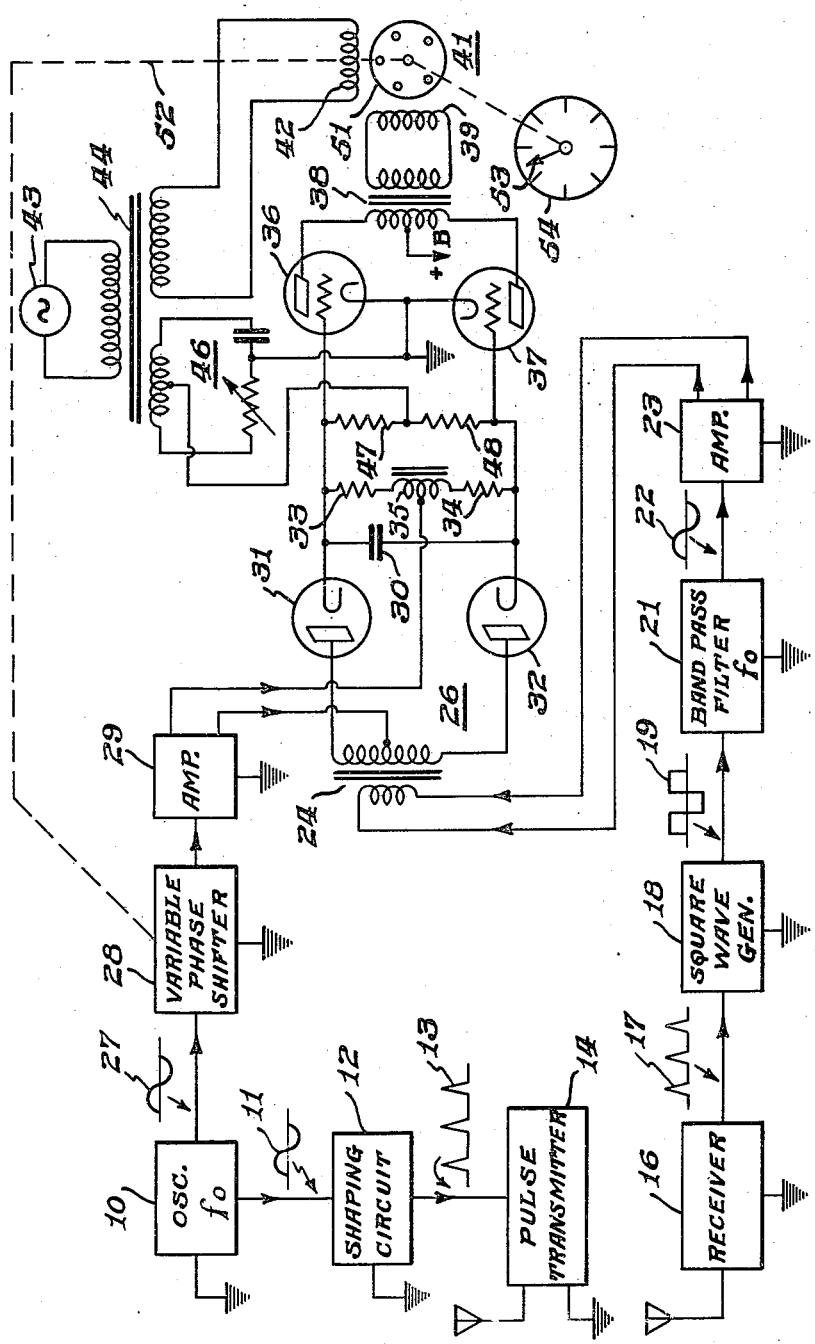

2,422,074

UNITED STATES PATENT OFFICE 2,422,074

RADIO PULSE TRANSMISSION SYSTEM

Donald S. Bond, Philadelphia, Pa., assignor to Radio Corporation of America, a corporation of Delaware Application September 25, 1942, Serial No. 459,621

5 Claims. (Cl. 250—1.66)

My invention relates to radio pulse-echo systems and particularly to systems which include electro-mechanical indicating or control apparatus that is responsive to the time delay between transmission and reception of a radio pulse.

Radio pulse-echo systems which are utilized to determine distance or altitude by measuring the time required for a radio pulse to travel from a transmitter to a reflecting object and back to a receiver located near the transmitter are well known. Such travel time is usually determined by means of a cathode ray indicator which is calibrated to read distance directly. For some applications it is desirable to have the distance indicated by a mechanical indicator such as a dial and pointer. Also it may be desirable to have other mechanism controlled or driven in accordance with the echo pulses.

An object of the present invention is to provide an improved means for and method of indicating distance in a pulse-echo system.

A further object of the invention is to provide an improved electro-mechanical system that is responsive to the elapsed time between transmission of a pulse and reception of the pulse after reflection.

In one preferred embodiment of the invention the received echo pulses are caused to trigger a square wave generator for producing a square wave current that is next converted into a sine wave current. This sine wave current is applied to a phase comparison circuit together with a phase reference sine wave current that is supplied from the pulse transmitter or from an oscillator feeding the pulse transmitter through a variable phase shifter. The output of the phase comparison circuit drives a reversible motor that is coupled to the variable phase shifter. The motor and the phase shifter are driven in one direction or the other until the phase difference between the two sine wave signals is 90 degrees, at which time the current supplied to the motor from the comparison circuit is zero and the motor stops. Thus an indicator coupled to the motor or phase shifter may be calibrated to read distance directly.

The invention will be better understood from the following description taken in connection with the accompanying drawing in which the single figure is a block and circuit diagram of one embodiment of the invention.

Referring to the drawing, the pulse transmitter of the system comprises a sine wave oscillator 10 operating at a frequency $f_0$ which supplies a sine wave signal 11 to a wave shaping circuit 12 which reshapes the signal to produce electrical pulses 13. The pulses 13 modulate a radio transmitter 14 whereby pulses of radio energy are radiated to earth or to some other reflecting surface or object.

The reflected or echo pulses are received and demodulated in a radio receiver 16. The output pulses 17 are applied to a square wave generator 18, such as a multivibrator, which is triggered to produce a current of a square wave form 19. The square wave current 19 is passed through a filter or tuned circuit 21 to convert it into a sine wave current 22 which is amplified by an amplifier 23 and impressed upon the input circuit transformer 24 of a phase discriminator 26.

A sine wave reference current 27 is supplied from the oscillator 10 through a variable phase shifter 28 and an amplifier 29 to the phase discriminator 26. It should be understood that the phase shifter may be located between the oscillator 10 and the wave shaping circuit 12, if desired, instead of in the position illustrated. Another suitable location for the phase shifter 28 is in the receiving circuit following the filter 21.

The phase discriminator 26 comprises a pair of diodes 31 and 32 connected in balanced relation. The diode plates are connected to opposite ends of the secondary of transformer 24 while the diode cathodes are connected to opposite ends of the serially connected resistors 33 and 34 and inductance coil 35. A filter capacitor 30 is connected in shunt to resistors 33 and 34. The coil 35 is included in the circuit to provide a derivative voltage whereby "hunting" is reduced as explained in my Patent 2,208,623, issued July 23, 1940.

The phase reference current 27 is applied to the discriminator 26 by connections to the midpoints of the secondary of transformer 24 and of the coil 35. The reference current 27 (after passing through phase shifter 28) and the sine wave current 22 representative of the received pulses are impressed across the diodes 31 and 32 in additive relation whereby the direct current output of the diodes depends upon the phase relation of the two signals at the discriminator 26. If this phase relation is 90 degrees, the diode outputs are equal and opposite in phase whereby the D.-C. voltage between the cathode and of resistor 33 and the cathode end of resistor 34 is zero.

A balanced amplifier comprising amplifier tubes 36 and 37 has its input circuit direct current connected across the diode resistors 33 and 34. Its output circuit is connected through a transformer 38 to one winding 39 of a reversible motor 41 which may be of the two phase type. The other motor winding 42 is connected to a power supply 43 circuit through a transformer 44.

In order to supply to the motor winding 39 a current that is 90 degrees out of phase with the current supplied to the motor winding 42, a voltage is fed into a phase shifting circuit 46 from the power supply 43. The voltage from circuit 46 is applied to the input circuit of amplifier tubes 36 and 37 by connections to the junction point of grid resistors 47 and 48 and to the amplifier tube cathodes.

From the foregoing it will be evident that no current is supplied to the motor winding 39 when the grids of tubes 36 and 37 are at equal bias potentials, this being the condition when the current 22 from the receiver is 90 degrees out of phase with respect to the reference current supplied from amplifier 29. Any departure from this 90 degree phase relation will cause the motor 41 to run in one direction or the other.

The rotor 51 of motor 41 is mechanically coupled to the variable phase shifter 28 as indicated by the broken line 52 so that the phase shifter is driven until the reference current is brought into the 90 degree phase relation with the receiver output signal 22 at which time the motor 41 stops. By coupling an indicating device such as a rotatable pointer 53 to the rotor 51 of the motor, and by properly calibrating the apparatus, the distance from the transmitter-receiver unit to the reflecting object may be read directly from a scale 54 associated with the pointer 53. The rotor 51 preferably is connected to the phase shifter 28 and to the pointer 53 through gear reduction units not shown.

The phase shifter 28, which may be similar to a goniometer, need not be described in detail since suitable phase shifters are well known. A phase shifter of the goniometer type is described, for example, in copending application Serial No. 421,071, filed November 29, 1941, in the name of Ray D. Kell and entitled Indicator and/or control system. While one specific phase discriminator circuit has been described, it should be understood that the invention is not limited to the use of this particular circuit.

I claim as my invention:

1. The method of operating a pulse-echo system which comprises transmitting pulses of energy to a reflecting object, receiving said pulses after reflection from said object, converting said received pulses into a sine wave current, producing a phase reference sine wave current at the transmitter, mixing the two sine wave currents and producing a control curent that is a measure of their phase difference, and shifting the phase of the two sine wave currents with respect to each other in accordance with the value of said control signal to bring the amount of said phase shift to a predetermined value whereby said amount of phase shift is a measure of the distance to said reflecting object.

2. The method of operating a pulse-echo system which comprises transmitting pulses of energy to a reflecting object, receiving said pulses after reflection from said object, converting said received pulses into a sine wave current, producing a phase reference sine wave current, shifting the phase of the phase reference current with respect to the transmitted pulses, mixing the two sine wave currents and producing a control current that is a measure of their phase difference, and varying the amount of said phase shift in accordance with the value of said control current to bring the amount of said phase shift to a predetermined value whereby said amount of phase shift is a measure of the distance to said reflecting object.

3. A pulse-echo system comprising means for transmitting pulses of energy to a reflecting object, a receiver for receiving said pulses after reflection from said object, means for converting said received pulses into a sine wave current, a phase discriminator circuit, means for applying said sine wave current to said discriminator circuit, means for obtaining a phase reference current of sine wave form from said transmitting means, variable phase shifting means for shifting the phase of said reference current and said first sine wave current with respect to each other, means for applying the reference current to said discriminator circuit whereby the output thereof varies in accordance with the phase relation of the two currents applied thereto, a motor that is mechanically coupled to said phase shifting means, and means for driving said motor in accordance with the output of said discriminator.

4. A pulse-echo system comprising means for transmitting pulses of energy to a reflecting object, a receiver for receiving said pulses after reflection from said object, means for converting said received pulses into a square wave current, means for converting said square wave current into a sine wave current, a phase discriminator circuit, means for obtaining a phase reference current of sine wave form from said transmitting means, variable phase shifting means for shifting the phase of said reference current and said first sine wave current with respect to each other, means for applying said two sine wave currents to said discriminator circuit whereby the output thereof varies in accordance with the phase relation of the two currents applied thereto, a motor that is mechanically coupled to said phase shifter, and means for driving said motor in accordance with the output of said discriminator.

5. A pulse-echo system comprising means for transmitting pulses of energy to a reflecting object, a receiver for receiving said pulses after reflection from said object, means for converting said received pulses into a square wave current, filter means for converting said square wave current into a sine wave current, a phase discriminator circuit, means for applying said sine wave current to said discriminator circuit, means for obtaining a phase reference current of sine wave form from said transmitting means, variable phase shifting means for shifting the phase of said reference current with respect to the transmitted pulses, means for applying the reference current to said discriminator circuit whereby the output thereof varies in accordance with the phase relation of the two currents applied thereto, a motor that is mechanically coupled to said phase shifting means, and means for driving said motor in accordance with the output of said discriminator.

DONALD S. BOND.